(12) United States Patent
Ma et al.

(10) Patent No.: US 8,872,866 B2
(45) Date of Patent: Oct. 28, 2014

(54) 3D DISPLAY PANEL AND PIXEL BRIGHTNESS CONTROL METHOD THEREOF

(75) Inventors: Chih-Yao Ma, Hsin-Chu (TW); Yu-Cheng Chang, Hsin-Chu (TW); Yi-Pai Huang, Hsin-Chu (TW); Cheng-Han Tsao, Hsin-Chu (TW); Chao-Yuan Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 218 days.

(21) Appl. No.: 13/284,976

(22) Filed: Oct. 30, 2011

(65) Prior Publication Data
US 2012/0320097 A1   Dec. 20, 2012

(30) Foreign Application Priority Data

Jun. 14, 2011  (TW) .............................. 100120764 A

(51) Int. Cl.
| | | |
|---|---|---|
| G09G 5/10 | (2006.01) | |
| H04N 13/04 | (2006.01) | |
| H04N 13/00 | (2006.01) | |
| G02B 27/26 | (2006.01) | |

(52) U.S. Cl.
CPC ....... H04N 13/0018 (2013.01); H04N 13/0434 (2013.01); G02B 27/26 (2013.01)
USPC ................. 345/690; 345/6; 359/19; 359/359; 359/464; 359/466; 348/54

(58) Field of Classification Search
USPC .......... 345/6, 89, 213, 589, 690; 359/19, 412, 359/464, 466; 349/15; 348/41, 51, 54
See application file for complete search history.

(56) References Cited

U.S. PATENT DOCUMENTS

| | | | |
|---|---|---|---|
| 6,911,784 B2 | 6/2005 | Sasaki | |
| 2004/0169670 A1 | 9/2004 | Uehara | |
| 2005/0219274 A1* | 10/2005 | Yang et al. ..................... | 345/690 |
| 2008/0123182 A1* | 5/2008 | Cernasov ....................... | 359/359 |
| 2009/0160871 A1* | 6/2009 | Hsu et al. ....................... | 345/589 |
| 2009/0213147 A1* | 8/2009 | Sagardoyburu et al. ...... | 345/690 |
| 2010/0220125 A1* | 9/2010 | Lin et al. ....................... | 345/694 |
| 2011/0175936 A1* | 7/2011 | Smith et al. ................... | 345/690 |
| 2011/0310131 A1* | 12/2011 | Fergason et al. .............. | 345/690 |
| 2012/0133576 A1* | 5/2012 | Kamada et al. ................. | 345/87 |

FOREIGN PATENT DOCUMENTS

CN  101363963 A  2/2009

* cited by examiner

Primary Examiner — Lun-Yi Lao
Assistant Examiner — Johny Lau
(74) Attorney, Agent, or Firm — Winston Hsu; Scott Margo

(57) ABSTRACT

A 3D display panel includes a plurality of first and second viewing angle pixels arranged along a first direction for displaying first and second viewing angle images respectively. The first viewing angle pixels and the second viewing angle pixels are interlacedly arranged along a second direction. A method for controlling pixel brightness of the 3D display panel includes determining a brightness value of a first block of a first viewing angle pixel according to a brightness value of the first viewing angle pixel and a brightness value of a second viewing angle pixel next to the first viewing angle pixel along the second direction, and determining a brightness value of a second block of the first viewing angle pixel according to the brightness value of the first block of the first viewing angle pixel and the brightness value of the first viewing angle pixel.

21 Claims, 6 Drawing Sheets

3D DISPLAY PANEL AND PIXEL BRIGHTNESS CONTROL METHOD THEREOF

BACKGROUND

1. Technical Field

The disclosure relates to a method for controlling pixel brightness of a 3D display panel, and more particularly, to a method for controlling pixel brightness of a 3D display panel to prevent crosstalk between left and right viewing angle images.

2. Description of Related Art

Please refer to FIG. 1. FIG. 1 is a diagram showing a 3D display panel 100 of the prior art. As shown in FIG. 1, the 3D display panel 100 comprises a plurality of first viewing angle pixels L' arranged horizontally for displaying first viewing angle images (such as left viewing angle images), and a plurality of second viewing angle pixels R' arranged horizontally for displaying second viewing angle images (such as right viewing angle images). Each row of the first viewing angle pixels L' and each row of the second viewing angle pixels R' are interlacedly arranged along vertical direction. The 3D display panel 100 further comprises a polarizer 110 and a quarter-wave plate 120 for separating the first viewing angle images and the second viewing angle images to be received by a left eye and a right eye of a user respectively through polarized glasses in order to generate 3D images.

Please refer to FIG. 2. FIG. 2 is a diagram showing the crosstalk effect between left and right viewing angle images of the 3D display panel 100. When a user 140 does not look straight at the 3D display panel, a left eye and a right eye of the user 140 will see partial images of the other viewing angle due to viewing angle offset (for example, a left eye 142 will see a partial image displayed by the second viewing angel pixels R'). That is, one eye receives two images of the same object, which causes the crosstalk effect. The above situation makes the images received by the user 140 become blurry, which seriously affects the image quality. The 3D display panel 100 of the prior art is highly susceptible to the crosstalk effect between left and right viewing angle images due to viewing angle offset.

SUMMARY OF THE INVENTION

The disclosure provides a method for controlling pixel brightness of a 3D display panel. The 3D display panel comprises a plurality of first viewing angle pixels arranged along a first direction for displaying first viewing angle images, and a plurality of second viewing angle pixels arranged along the first direction for displaying second viewing angle images. The plurality of first viewing angle pixels and the plurality of second viewing angle pixels are interlacedly arranged along a second direction. The method comprises determining a brightness value of a first block of the first viewing angle pixel according to a predetermined brightness value of the first viewing angle pixel and a predetermined brightness value of the second viewing angle pixel next to the first viewing angle pixel along the second direction, and determining a brightness value of a second block of the first viewing angle pixel according to the brightness value of the first viewing angle pixel and the predetermined brightness value of the first block of the first viewing angle pixel.

The disclosure further provides a wide-viewing-angle 3D display panel. The wide-viewing-angle 3D display panel comprises a plurality of first viewing angle pixels arranged along a first direction for displaying first viewing angle images, a plurality of second viewing angle pixels arranged along the first direction for displaying second viewing angle images, and a brightness control unit. Each of the first viewing angle pixels comprises a first block and a second block. Each of the second viewing angle pixels comprises a first block and a second block. The plurality of first viewing angle pixels and the plurality of second viewing angle pixels are interlacedly arranged along a second direction. The brightness control unit is electrically connected to the plurality of first viewing angle pixels and the plurality of second viewing angle pixels for controlling brightness values of the plurality of first viewing angle pixels and the plurality of second viewing angle pixels. The brightness control unit determines a brightness value of the first block of the first viewing angle pixel according to a predetermined brightness value of the first viewing angle pixel and a predetermined brightness value of the second viewing angle pixel next to the first viewing angle pixel along the second direction. The brightness control unit determines a brightness value of the second block of the first viewing angle pixel according to the predetermined brightness value of the first viewing angle pixel and the brightness value of the first block of the first viewing angle pixel.

The disclosure further provides a method for increasing viewing angles of a 3D display panel. The 3D display panel comprises a plurality of first viewing angle pixels arranged along a first direction for displaying first viewing angle images, and a plurality of second viewing angle pixels arranged along the first direction for displaying second viewing angle images. The plurality of first viewing angle pixels and the plurality of second viewing angle pixels are interlacedly arranged along a second direction. The method comprises determining positions of a first block and a second block of the first viewing angle pixel and positions of a first block and a second block of the second viewing angle pixel according to a viewing angle direction, determining brightness values of the first block and the second block of the first viewing angle pixel according to a predetermined brightness value of the first viewing angle pixel and a predetermined brightness value of the second viewing angle pixel next to the first viewing angle pixel along the second direction, and determining brightness values of the first block and the second block of the second viewing angle pixel according to a predetermined brightness value of the second viewing angle pixel and a predetermined brightness value of the first viewing angle pixel next to the second viewing angle pixel along the second direction.

These and other objectives of the disclosure will no doubt become obvious to those of ordinary skill in the art after reading the following detailed description of the preferred embodiment that is illustrated in the various figures and drawings.

DETAILED DESCRIPTION

Figure 1:
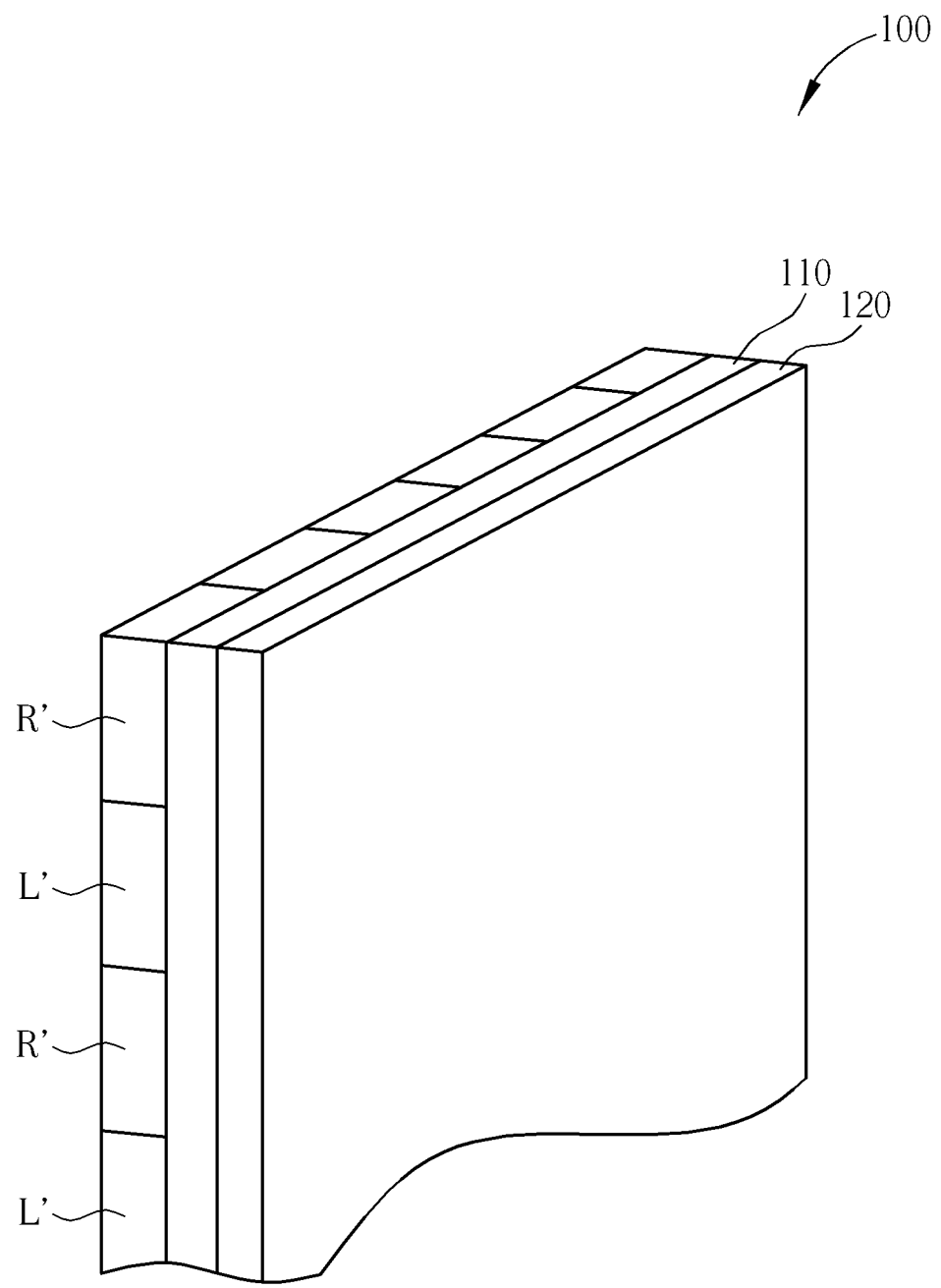
FIG. 1 is a diagram showing a 3D display panel of the prior art.
Figure 2:
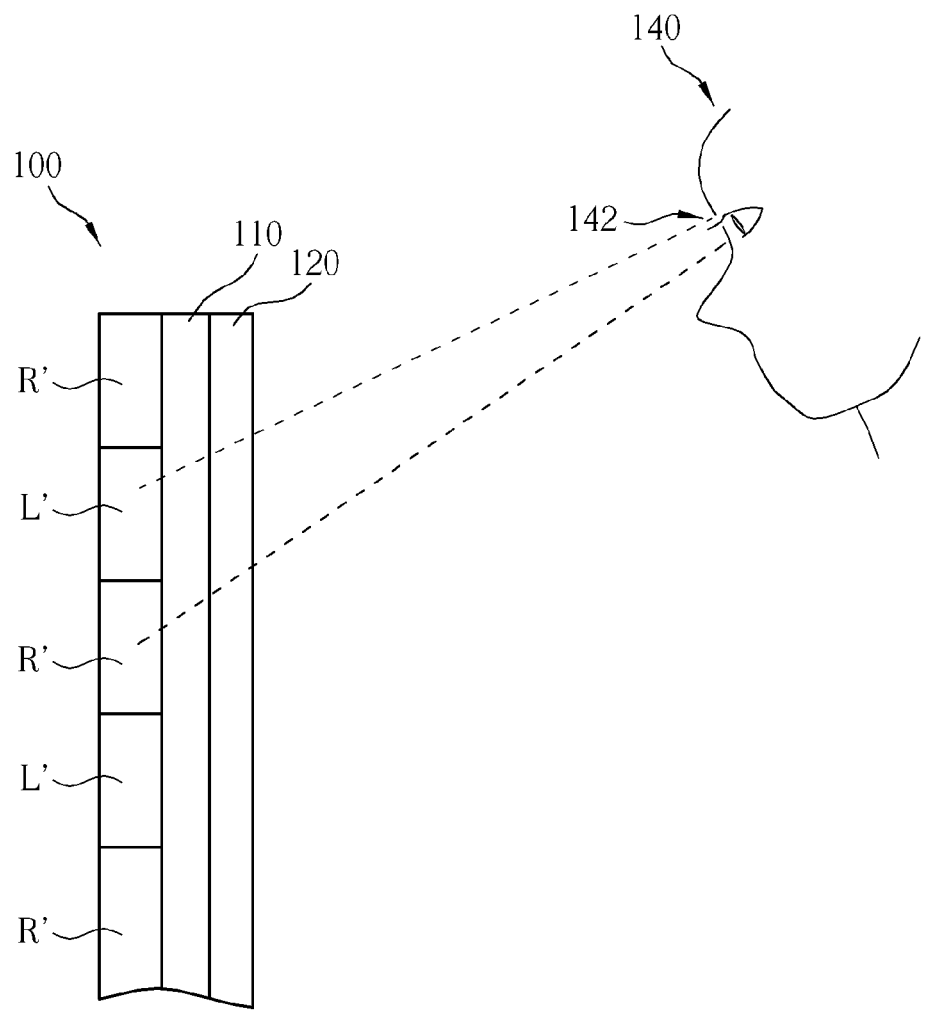
FIG. 2 is a diagram showing crosstalk effect of left and right viewing angle images of the 3D display panel of the prior art.
Figure 3:
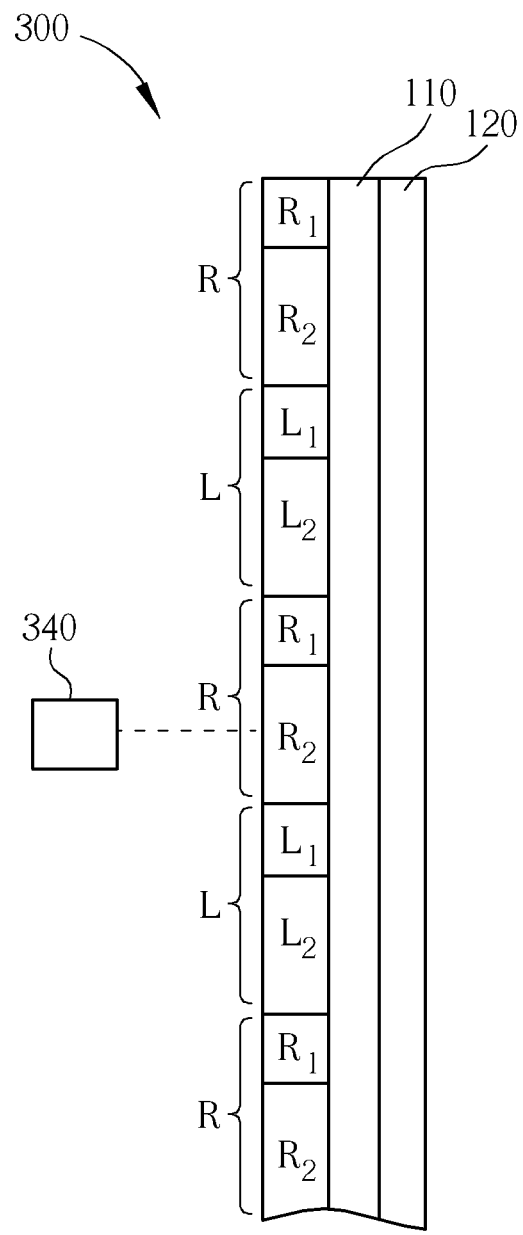
FIG. 3 is a side view of an embodiment of the 3D display panel.
Figure 6:
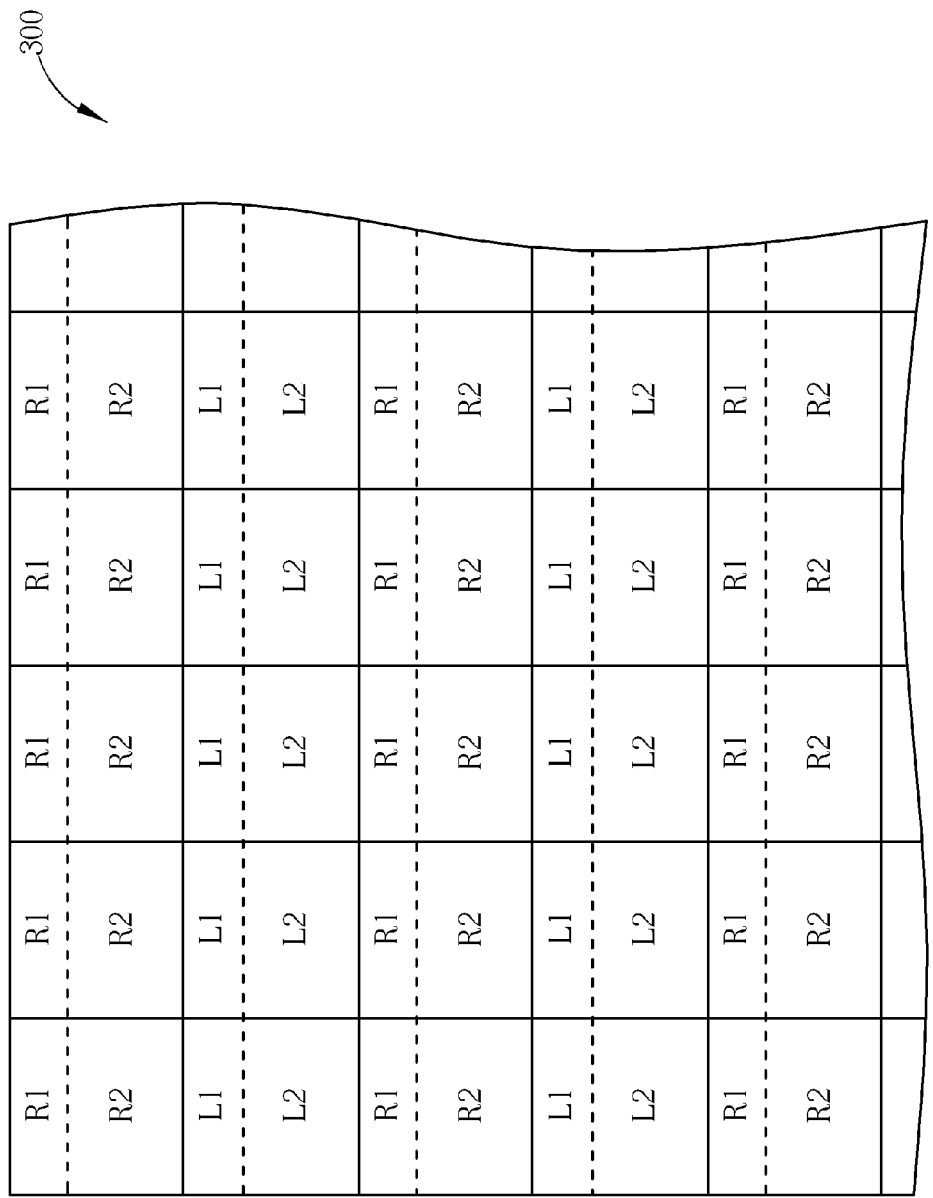
FIG. 6 is a top view of the 3D display panel of FIG. 3.

Please refer to FIG. 3 and FIG. 6. FIG. 3 is a side view of an embodiment of a 3D display panel 300. FIG. 6 is a top view of the 3D display panel 300 of FIG. 3. The 3D display panel 300 of the disclosure comprises a plurality of first viewing angle pixels L arranged horizontally for displaying first viewing angle images (such as left viewing angle images), and a plurality of second viewing angle pixels R arranged horizontally for displaying second viewing angle images (such as right viewing angle images). Each row of the first viewing angle pixels L and each row of the second viewing angle pixels R are interlacedly arranged along a vertical direction. The 3D display panel 300 further comprises a polarizer 110 and a quarter-wave plate 120 for separating the first viewing angle images and the second viewing angle images to be received by a left eye and a right eye of a user respectively through polarized glasses in order to generate 3D images. Different from the prior art, the first viewing angle pixel L of the 3D display panel 300 is divided into plurality blocks, for example, a first block $L_1$ and a second block $L_2$, where the first block $L_1$ is arranged above the second block $L_2$; the second viewing angle pixel R is divided into plurality blocks, for example, a first block $R_1$ and a second block $R_2$, where the first block $R_1$ is arranged above the second block $R_2$. In addition, the 3D display panel 300 comprises a brightness control unit 340 electrically connected to the first viewing angle pixels L and the second viewing angle pixels R for controlling brightness values of the first viewing angle pixels L and the second viewing angle pixels R.

Furthermore, in the above embodiment, the first viewing angle pixels L and the second viewing angle pixels R are arranged horizontally, and each row of the first viewing angle pixels L and each row of the second viewing angle pixels R are interlacedly arranged along the vertical direction. Each of the first viewing angle pixels and the second viewing angle pixels are divided into a first block and a second block along the vertical direction. However, in other embodiments, the first viewing angle pixels and the second viewing angle pixels can be arranged vertically, each row of the first viewing angle pixels and each row of the second viewing angle pixels are interlacedly arranged along the horizontal direction, and each of the first viewing angle pixels and the second viewing angle pixels is divided into a first block and a second block respectively along the horizontal direction. A combination of the polarizer 110 and the quarter-wave plate 120 is an example illustrating how to separate the first viewing angle images and the second viewing angle images. The 3D display panel can also utilize other components to separate the first viewing angle images and the second viewing angle images.

When displaying images, the brightness control unit 340 can turn off the first block $L_1$ of the first viewing angle pixel L and the first block $R_1$ of the second viewing angle pixel R (or partially display black images) to prevent the crosstalk effect between left and right viewing angle images. Therefore, in a certain viewing angle range, a left eye and a right eye of a user will not see partial images of the other viewing angle (i.e. images displayed by the first block $L_1$ of the first viewing angle pixel L, and images displayed by the first block $R_1$ of the second viewing angle pixel R). However, the above arrangement will reduce brightness of images of the 3D display panel 300.

In order to prevent reducing the brightness of the images when solving the crosstalk effect, the disclosure provides a method for controlling pixel brightness of the 3D display panel 300. The brightness control unit 340 determines a brightness value of the first block $L_1$ of the first viewing angle pixel according to a predetermined brightness value of the first viewing angle pixel L and a predetermined brightness value of the second viewing angle pixel R next to the first viewing angle L along the vertical direction. For example, in order to prevent the crosstalk effect when looking down on the 3D display panel 300, the brightness value of the first block $L_1$ of the first viewing angle pixel is a minimum value of the predetermined brightness values of the first viewing angle pixel L and the second viewing angle pixel R multiplied by an area ratio between the first block $L_1$ and the first viewing angle pixel L. The brightness value of the first block $L_1$ of the first viewing angle pixel L can be determined according to the following equation:

$$BL_1 = \min(BL, BR) \times (A_{L1}/A_L) \qquad (1)$$

where $BL_1$ is the brightness value of the first block $L_1$ of the first viewing angle pixel, BL is the predetermined brightness value of the first viewing angle pixel L, BR is the predetermined brightness value of the second viewing angle pixel R, $A_{L1}$ is area of the first block $L_1$ of the first viewing angle pixel, $A_L$ is area of the first viewing angle pixel L, and min( ) represents a minimum value in the brackets.

Or, the brightness value of the first block $L_1$ of the first viewing angle pixel can also be an average value of the predetermined brightness values of the first viewing angle pixel L and the second viewing angle pixel R multiplied by the area ratio between the first block $L_1$ and the first viewing angle pixel L. The brightness value of the first block $L_1$ of the first viewing angle pixel can be determined according to the following equation:

$$BL_1 = [(BL+BR)/2] \times (A_{L1}/A_L) \qquad (2)$$

The brightness value of the first block $L_1$ of the first viewing angle pixel is determined by either equation (1) or equation (2) according to a reference value. For example, the reference value can be determined by subtracting the minimum value of the predetermined brightness values of the first and the second viewing angle pixels multiplied by the area ratio between the first block $L_1$ and the first viewing angle pixel L and a maximum brightness value of the second block $L_2$ of the first viewing angle pixel from the predetermined brightness value of the first viewing angle pixel L. The reference value can be determined according to the following equation:

$$D = BL - \min(BL, BR) \times (A_{L1}/A_L) - BL_{2max} \qquad (3)$$

where D is the reference value, and $BL_2$ max is the maximum brightness value of the second block $L_2$ of the first viewing angle pixel. A maximum brightness value is a maximum gray level value of a pixel multiplied by an area of the pixel. When the reference value is less than or equal to zero, the brightness value of the first block $L_1$ of the first viewing angle pixel is determined by equation (1). When the reference value is greater than zero, the brightness value of the first block $L_1$ of the first viewing angle pixel is determined by equation (2).

After determining the brightness value of the first block $L_1$ of the first viewing angle pixel, the brightness control unit 340 determines a brightness value of the second block $L_2$ of the first viewing angle pixel according to the predetermined brightness value of the first viewing angle pixel L and the brightness value of the first block $L_1$ of the first viewing angle pixel. The brightness value of the second block $L_2$ of the first viewing angle pixel can be determined according to the following equation:

$$BL_2 = BL - BL_1 \qquad (4)$$

where $BL_2$ is the brightness value of the second block $L_2$ of the first viewing angle pixel. According to the above method, the brightness values of the first block $L_1$ and the second block $L_2$ of the first viewing angle pixel are determined in order to prevent the crosstalk effect between left and right viewing angle images without reducing brightness of the displayed images.

After determining the brightness values of the first block $L_1$ and the second block $L_2$ of the first viewing angle pixel, the brightness control unit 340 determines gray level values of the first block $L_1$ and the second block $L_2$ of the first viewing angle pixel according to areas of the first block $L_1$ and the second block $L_2$ of the first viewing angle pixel. In one pixel, the brightness value is a pixel area multiplied by a gray level value. For example if the brightness values of the first block $L_1$ and the second block $L_2$ of the first viewing angle pixel are 100 and 220 respectively, and the areas of the first block $L_1$ and the second block $L_2$ of the first viewing angle pixel are 1 and 2 respectively, then the gray level value of the first block $L_1$ of the first viewing angle pixel is 100 and the gray level value of the second block $L_2$ of the first viewing angle pixel is 110.

In the above illustration, the first viewing angle pixel L is a left viewing angle pixel, and the second viewing angle pixel R is a right viewing angle pixel. But since the first viewing angle pixels and the second viewing angle pixels are arranged symmetrically, the brightness values of the first block and the second block of the second viewing angle pixel can be determined according to the same method. That is, the right viewing angle pixel can be defined as the first viewing angel pixel and the left viewing angle pixel can be defined as the second viewing angle pixel.

In addition, in the above embodiment, the first viewing angle pixel L is divided into two blocks. The first block $L_1$ of the first viewing angle pixel is arranged above the second block $L_2$ of the first viewing angle pixel. The second viewing angle pixel R is also divided into two blocks. The first block $R_1$ of the second viewing angle pixel is arranged above the second block $R_2$ of the second viewing angle pixel. Areas of the first blocks $L_1/R_1$ are smaller than areas of the second blocks $L_2/R_2$. Therefore, the method can prevent the crosstalk effect of left and right viewing angle images caused by offset of viewing angle when looking down on the 3D display panel. When the first blocks are arranged below the second blocks, the method can prevent the crosstalk effect between left and right viewing angle images caused by viewing angle offset when looking up at the 3D display panel. In other embodiments, the viewing angle pixel can be divided into more blocks having the same area. However, areas of the blocks can be adjusted according to requirements, such that the brightness value of each block can be adjusted more flexibly.

Figure 4:
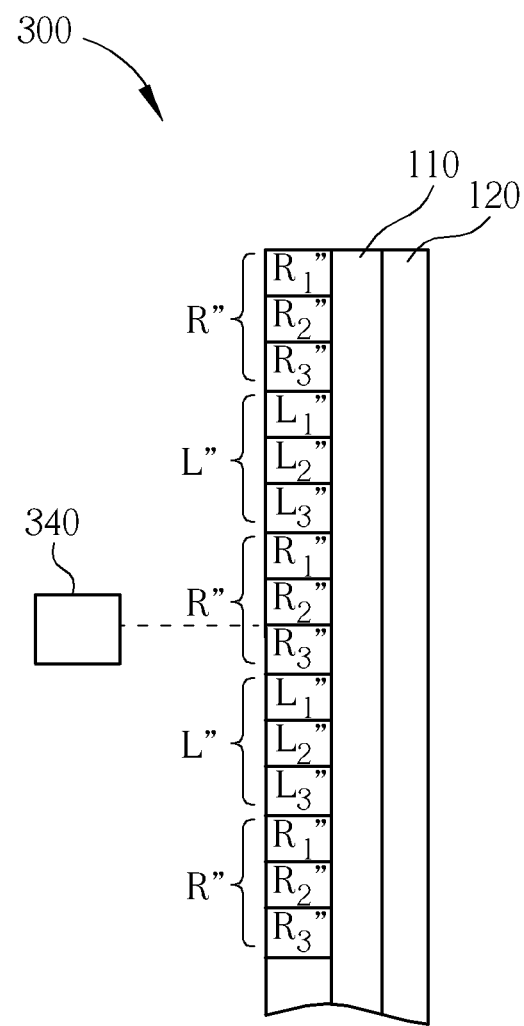
FIG. 4 is a diagram showing another embodiment of the 3D display panel.

Please refer to FIG. 4. FIG. 4 is a diagram showing another embodiment of a 3D display panel 400. As shown in FIG. 4, a first viewing angle pixel L" is divided into three blocks of equal (or unequal) area. For example, a top block $L_1"$ and a bottom block $L_3"$ have the same area. The top block $L_1"$ or the bottom block $L_3"$ can be defined as a first block of the first viewing angle pixel L", and a combination of the other two blocks can be defined as a second block of the first viewing angle pixel L". When areas of the three blocks are equal, the area of the second block of the first viewing angle pixel L" is twice the area of the first block of the first viewing angle pixel. According to the above arrangement, the crosstalk effect between left and right viewing angle images caused by viewing angle offset can be prevented when looking down/up at the 3D display panel.

Similarly, when the first viewing angle pixel and the second viewing angle pixel are arranged vertically, each row of the first viewing angle pixel and each row of the second viewing angle pixel are interlacedly arranged along the horizontal direction, and the first viewing angle pixel and the second viewing angle pixel are divided into three blocks along the horizontal direction respectively, the above arrangement can prevent the crosstalk effect between left and right viewing angle images caused by offset of left and right viewing angles.

Figure 5:
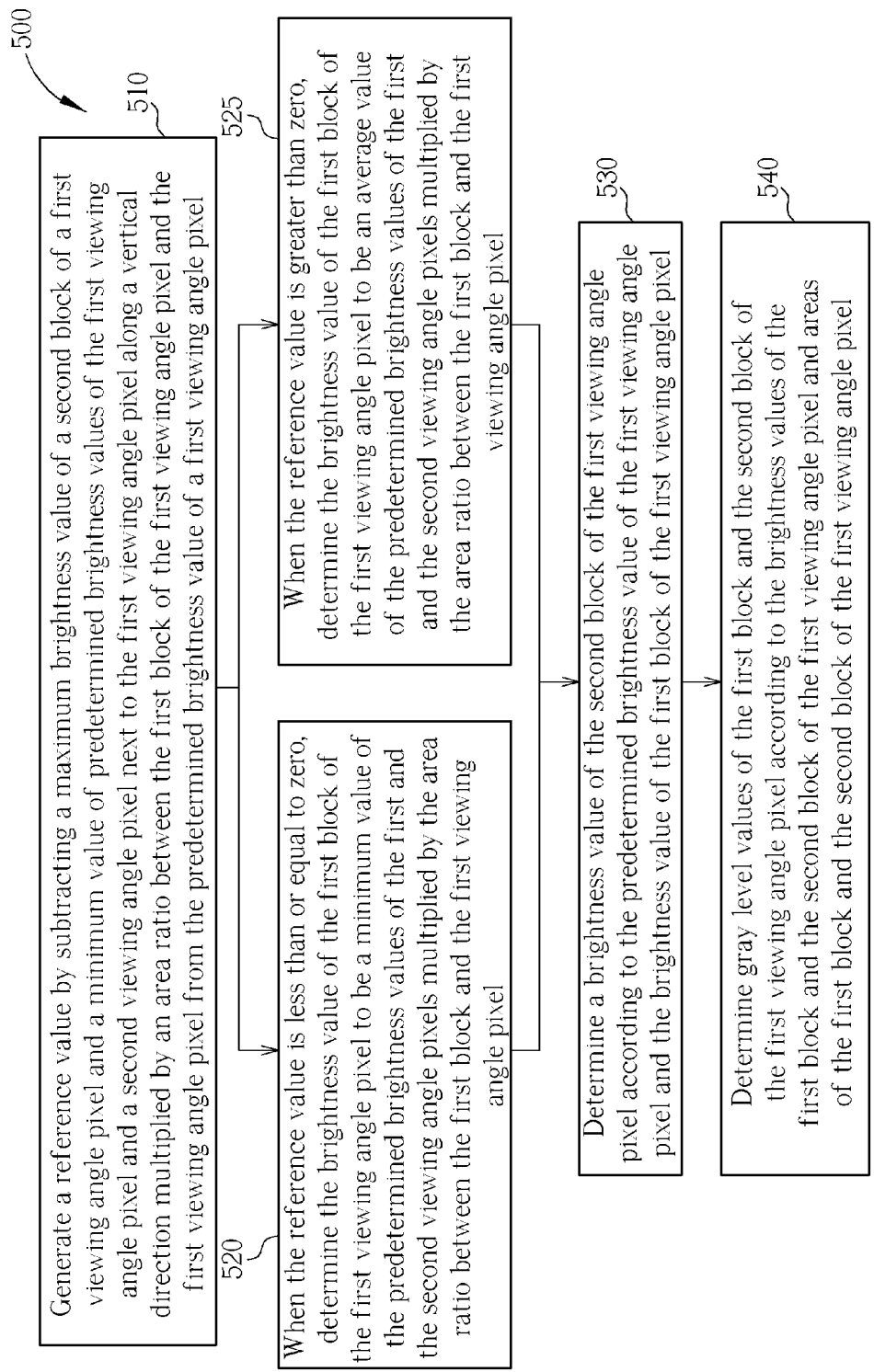
FIG. 5 is a flowchart showing a method for controlling pixel brightness of the 3D display panel.

Please refer to FIG. 5. FIG. 5 is a flowchart showing a method for controlling pixel brightness of the 3D display panel. The flowchart of the method for controlling pixel brightness of the 3D display panel comprises the following steps:

Step 510: Generate a reference value by subtracting a maximum brightness value of a second block of a first viewing angle pixel and a minimum value of predetermined brightness values of the first viewing angle pixel and a second viewing angle pixel next to the first viewing angle pixel along a vertical direction multiplied by an area ratio between the first block of the first viewing angle pixel and the first viewing angle pixel from the predetermined brightness value of a first viewing angle pixel;

Step 520: When the reference value is less than or equal to zero, determine the brightness value of the first block of the first viewing angle pixel to be a minimum value of the predetermined brightness values of the first and the second viewing angle pixels multiplied by the area ratio between the first block and the first viewing angle pixel;

Step 525: When the reference value is greater than zero, determine the brightness value of the first block of the first viewing angle pixel to be an average value of the predetermined brightness values of the first and the second viewing angle pixels multiplied by the area ratio between the first block and the first viewing angle pixel;

Step 530: Determine a brightness value of the second block of the first viewing angle pixel according to the predetermined brightness value of the first viewing angle pixel and the brightness value of the first block of the first viewing angle pixel; and Step 540: Determine gray level values of the first block and the second block of the first viewing angle pixel according to the brightness values of the first block and the second block of the first viewing angle pixel and areas of the first block and the second block of the first viewing angle pixel.

In the above illustration, equations (1) to (4) are utilized for explaining one of the embodiments of the disclosure. Any method for controlling pixel brightness of a 3D display panel according to the above steps should be included within the scope of the disclosure.

In contrast to the prior art, the 3D display panel of the disclosure and the method for controlling pixel brightness of the 3D display panel can prevent the crosstalk effect between left and right viewing angle images caused by viewing angle offset without reducing brightness of the displayed images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling pixel brightness of a 3D display panel, the 3D display panel comprising a plurality of first viewing angle pixels arranged along a first direction for displaying first viewing angle images, and a plurality of second viewing angle pixels arranged along the first direction for displaying second viewing angle images, the plurality of first viewing angle pixels and the plurality of second viewing angle pixels being interlacedly arranged along a second direction, and each of the first and second viewing angle pixels comprising a first block and a second block, the first block and the second block of the first viewing angle pixel having the same fixed viewing angle, the first block and the second block of the second viewing angle pixel having the same fixed viewing angle different from the first viewing angle, the method comprising:

determining a brightness value of a first block of a first viewing angle pixel according to a predetermined brightness value of the first viewing angle pixel and a predetermined brightness value of a second viewing angle pixel next to the first viewing angle pixel along the second direction;

determining a brightness value of a second block of the first viewing angle pixel according to the predetermined brightness value of the first viewing angle pixel and the brightness value of the first block of the first viewing angle pixel;

and generating a reference value by subtracting a maximum brightness value of the second block of the first viewing angle pixel and a minimum value of the predetermined brightness values of the first and the second viewing angle pixels multiplied by an area ratio between the first block and the first viewing angle pixel from the predetermined brightness value of the first viewing angle pixel.

2. The method of claim 1 further comprising determining a gray level value of the first block and the second block of the first viewing angle pixel according to the brightness values of the first block and the second block of the first viewing angle pixel and areas of the first block and the second block of the first viewing angle pixel.

3. The method of claim 1, wherein when the reference value is less than or equal to zero, the step of determining the brightness value of the first block of the first viewing angle pixel according to the predetermined brightness value of the first viewing angle pixel and the predetermined brightness value of the second viewing angle pixel next to the first viewing angle pixel along the second direction comprises:

multiplying the minimum value of the predetermined brightness values of the first and the second viewing angle pixels by an area ratio between the first block of the first viewing angle pixel and the first viewing angle pixel.

4. The method of claim 1, wherein when the reference value is greater than zero, the step of determining the brightness value of the first block of the first viewing angle pixel according to the predetermined brightness value of the first viewing angle pixel and the predetermined brightness value of the second viewing angle pixel next to the first viewing angle pixel along the second direction comprises:

multiplying an average value of the predetermined brightness values of the first and the second viewing angle pixels by an area ratio between the first block of the first viewing angle pixel and the first viewing angle pixel.

5. The method of claim 1, wherein the first direction is horizontal or vertical, and the second direction is perpendicular to the first direction.

6. A wide-viewing-angle 3D display panel, comprising:

a plurality of first viewing angle pixels arranged along a first direction for displaying first viewing angle images, each of the first viewing angle pixels comprising a first block and a second block with the same fixed viewing angle;

a plurality of second viewing angle pixels arranged along the first direction for displaying second viewing angle images, each of the second viewing angle pixels comprising a first block and a second block with the same fixed viewing angle different from the first viewing angle, wherein the plurality of first viewing angle pixels and the plurality of second viewing angle pixels are interlacedly arranged along a second direction; and a brightness control unit electrically connected to the plurality of first viewing angle pixels and the plurality of second viewing angle pixels for controlling brightness values of the plurality of first viewing angle pixels and the plurality of second viewing angle pixels;

wherein the brightness control unit determines brightness values of the first block and the second block of the first viewing angle pixel according to a predetermined brightness value of the first viewing angle pixel and a predetermined brightness value of the second viewing angle pixel next to the first viewing angle pixel along the second direction, and a reference value is generated by subtracting a maximum brightness value of the second block of the first viewing angle pixel and a minimum value of the predetermined brightness values of the first and the second viewing angle pixels multiplied by an area ratio between the first block and the first viewing angle pixel from the predetermined brightness value of the first viewing angle pixel.

7. The 3D display panel of claim 6 further comprising a polarizer.

8. The 3D display panel of claim 6 further comprising a quarter-wave plate.

9. The 3D display panel of claim 6, wherein the first direction is horizontal or vertical, and the second direction is perpendicular to the first direction.

10. The 3D display panel of claim 6, wherein the first viewing angle pixel and the second viewing angle pixel are divided into a plurality of sub-blocks, the first block of the first viewing angle pixel comprises at least one sub-block, the second block of the first viewing angle pixel comprises at least two sub-blocks, the first block of the second viewing angle pixel comprises at least one sub-block, and the second block of the second viewing angle pixel comprises at least two sub-blocks.

11. The 3D display panel of claim 10, wherein areas of the plurality of sub-blocks can be equal or unequal.

12. The 3D display panel of claim 10, wherein areas of the second blocks of the first viewing angle pixel and the second viewing angle pixel are larger than areas of the first blocks of the first viewing angle pixel and the second viewing angle pixel.

13. The 3D display panel of claim 6, wherein the first blocks and the second blocks of the first viewing angle pixel and the second viewing angle pixel are arranged along the second direction.

14. The 3D display panel of claim 6, wherein the brightness control unit determines a brightness value of the first block of the first viewing angle pixel according to a predetermined brightness value of the first viewing angle pixel and a predetermined brightness value of the second viewing angle pixel next to the first block of the first viewing angle pixel along the second direction, and the brightness control unit determines a brightness value of the second block of the first viewing angle pixel according to the predetermined brightness value of the first viewing angle pixel and the brightness value of the first block of the first viewing angle pixel.

15. The 3D display panel of claim 6, wherein the brightness control unit determines a brightness value of the first block of the second viewing angle pixel according to a predetermined brightness value of the second viewing angle pixel and a predetermined brightness value of the first viewing angle pixel next to the first block of the second viewing angle pixel along the second direction, and the brightness control unit determines a brightness value of the second block of the second viewing angle pixel according to the predetermined brightness value of the second viewing angle pixel and the brightness value of the first block of the second viewing angle pixel.

16. A method for increasing viewing angles of a 3D display panel, the 3D display panel comprising a plurality of first viewing angle pixels for displaying first viewing angle images, and a plurality of second viewing angle pixels for displaying second viewing angle images, the method comprising:

dividing each of the first and second viewing angle pixels into a first block and a second block, the first block and the second block of the first viewing angle pixel having the same fixed viewing angle, the first block and the second block of the second viewing angle pixel having the same fixed viewing angle different from the first viewing angle;

arranging the plurality of first viewing angle pixels along a first direction and arranging the plurality of second viewing angle pixels along the first direction, wherein the plurality of first viewing angle pixels and the plurality of second viewing angle pixels are interlacedly arranged along a second direction, and each first block and each second block are arranged along the second direction;

determining positions of a first block and a second block of the first viewing angle pixel and positions of a first block and a second block of the second viewing angle pixel according to a viewing angle direction;

determining brightness values of the first block and the second block of the first viewing angle pixel according to a predetermined brightness value of the first viewing angle pixel and a predetermined brightness value of the second viewing angle pixel next to the first viewing angle pixel along the second direction;

determining brightness values of the first block and the second block of the second viewing angle pixel according to a predetermined brightness value of the second viewing angle pixel and a predetermined brightness value of the first viewing angle pixel next to the second viewing angle pixel along the second direction;

and generating a reference value by subtracting a maximum brightness value of the second block of the first viewing angle pixel and a minimum value of the predetermined brightness values of the first and the second viewing angle pixels multiplied by an area ratio between the first block and the first viewing angle pixel from the predetermined brightness value of the first viewing angle pixel.

17. The method of claim 16, wherein the first direction is horizontal or vertical, and the second direction is perpendicular to the first direction.

18. The method of claim 16, wherein the brightness value of the first block of the first viewing angle pixel is determined by the predetermined brightness value of the first viewing angle pixel and the predetermined brightness value of the second viewing angle pixel next to the first block of the first viewing angle pixel along the second direction.

19. The method of claim 18, wherein the brightness value of the second block of the first viewing angle pixel is determined by the predetermined brightness value of the first viewing angle pixel and the brightness value of the first block of the first viewing angle pixel.

20. The method of claim 16, wherein the brightness value of the first block of the second viewing angle pixel is determined by the predetermined brightness value of the second viewing angle pixel and the predetermined brightness value of the first viewing angle pixel next to the first block of the second viewing angle pixel along the second direction.

21. The method of claim 20, wherein the brightness value of the second block of the second viewing angle pixel is determined by the predetermined brightness value of the second viewing angle pixel and the brightness value of the first block of the second viewing angle pixel.

* * * * *